United States Patent [19]

Mills

[11] 4,136,199

[45] Jan. 23, 1979

[54] METALLIC ION REMOVAL FROM PHOSPHORIC ACID

[75] Inventor: Harold E. Mills, Lake City, Fla.

[73] Assignee: Occidental Chemical Company, Houston, Tex.

[21] Appl. No.: 810,484

[22] Filed: Jun. 27, 1977

[51] Int. Cl.$^2$ ............................................. C01B 25/18
[52] U.S. Cl. ................. 423/321 R; 423/126; 423/163; 423/317
[58] Field of Search .................... 423/321 R, 317, 497, 423/126, 163

[56] References Cited

U.S. PATENT DOCUMENTS

| | | | |
|---|---|---|---|
| 3,124,419 | 3/1964 | German et al. | 423/320 |
| 3,206,282 | 9/1965 | Crawford et al. | 423/321 R |
| 3,379,501 | 4/1968 | Treitler et al. | 423/321 R |
| 3,442,609 | 5/1969 | Carothers et al. | 423/321 R |
| 3,494,736 | 2/1970 | Carothers et al. | 423/126 |
| 4,028,237 | 6/1977 | Nishimura et al. | 423/321 R |

FOREIGN PATENT DOCUMENTS

| | | | |
|---|---|---|---|
| 46-40534 | 11/1971 | Japan | 423/321 R |
| 47-25090 | 10/1972 | Japan | 423/321 R |
| 467843 | 6/1937 | United Kingdom. | |

*Primary Examiner*—Herbert T. Carter
*Attorney, Agent, or Firm*—Christie, Parker & Hale

[57] ABSTRACT

Metal ion impurities are removed from phosphoric acid by adding to the acid a precipitant comprising ions of calcium and fluorine to cause precipitation of a fluoride solid which contains ions of magnesium, and other metals (e.g., Al, $N_a$) which were in the impure acid. A preferred precipitant comprises calcium fluoride, such as the sludge obtained by treating pond water from a phosphoric acid plant with calcium ions (e.g. lime and/or limestone).

21 Claims, No Drawings

METALLIC ION REMOVAL FROM PHOSPHORIC ACID

BACKGROUND OF THE INVENTION

British Pat. No. 1,337,669 discloses a process for precipitation of ionic metal impurities from phosphoric acid by adding an organic water soluble solvent and alkali metal or ammonium ions thereto, filtering off the precipitate, then passing the filtered solvent/phosphoric acid phase through a strongly acid cation exchange resin and, finally, removing the solvent from the purified acid (by distillation).

U.S. Pat. No. 3,642,439 to Moore et al, discloses a process for removing magnesium impurities from weak, wet-process phosphoric acid by evaporating the acid until the $SiO_2$ content of the acid is reduced to less than 0.2%, maintaining the evaporated acid at 50–100° C. for at least 15 hours to form a precipitate comprising a magnesium-aluminum-fluoride-phosphate complex compound and separating the precipitate from the purified, concentrated phosphoric acid. Further disclosed is the addition of a "seeding" compound having a weight ratio of magnesium oxide to aluminum oxide of 1 to 1.4 and a ratio of magnesium oxide to fluorine of 1 to 2.2. In the present invention where the calcium fluoride precipitant is an impure sludge obtained from pond water by precipitation with $ca^+$, some magnesium can be present in the sludge; however, the weight ratio MgO to $Al_2O_3$ of the sludge is in the range of about 1 to 6 to about 75 and the weight ratio MgO to F is typically about 1 to 23 to about 260.

SUMMARY OF THE INVENTION

This invention relates to a process for purifying phosphoric acid, especially acid produced by a "wet process", by precipitating metallic impurities such as magnesium and aluminum ions from the acidic aqueous phosphatic solution.

Metal ion impurities are removed from phosphoric acid by adding to the acid a precipitant comprising ions of calcium and fluorine to cause precipitation of a fluoride solid which contains ions of magnesium, and other metals (e.g., Al, Na) which were in the impure acid. A preferred precipitant comprises calcium fluoride, such as the sludge obtained by treating pond water from a phosphoric acid plant with calcium ions (e.g. lime and/or limestone).

In one embodiment of the invention, wet process phosphoric acid (typically containing 38% to 54% by weight of $P_2O_5$, 0.3% to 1.75% MgO by weight as well as sodium, iron, aluminum and other impurities) is treated with sufficient amount of calcium fluoride, preferably as the "fluoride solid" or "synthetic fluorospar" or "sludge" from pond water treatment with $Ca^{+2}$ (e.g., see Patent Application Ser. No. 457,565 filed Apr. 3, 1974 by Hirko and Mills (now abandoned in favor of application Ser. No. 756,009, filed Jan. 3, 1977) the entire disclosure of which is incorporated herein by this reference) to precipitate 25–70% of the magnesium and 5–25% of the aluminum from the wet process acid.

"Synthetic Fluorspar" or "calcium fluoride" sludge can be obtained by treating waste pond water from a wet process phosphoric acid plant with limestone and/or lime and/or slaked lime to produce a fluoride containing sludge, (e.g. see U.S. Pat. Nos. 3,907,978; 3,625,648; 3,151,938; 2,976,119 and 2,780,523). The sludge typically contains about fifty (50) % water. On a dry basis the solids in the sludge analyze: P, 3–10% (probably present as $PO_4$); Mg, 0.05–0.3%; Ca, 20–35%; Fe, 0.3–3%; Al, 1–5%; Na, 0.7–3%; Si, 0.5–8%; F, 13–30%; $SO_4$, 3–15%.

X-ray diffraction studies of the "salt" precipitated from the acid by the sludge show the major phase to be a type of Ralstonite, $Na_xMg_xAl_{2-x}(F,OH)_6\ H_2O$. The amount of fluoride solid needed for treatment of the wet process phosphoric acid is usually 1% to 5% by weight. The optimum temperature to precipitate the impurities in the acid is about 115–170° F. and in a time of about 1–7 days.

By the addition of sulfuric acid stoichiometric to the fluorine admitted with the fluoride solids the precipitation time can be reduced by about 40–50%. The solids precipitated can be separated from the purified wet process phosphoric acid by vacuum filtration using a filter aid such as diatomaceous earth, (e.g., see Ser. No. 744,229 filed Nov. 23, 1976 of Smith, Myrick and Atwood, the entire disclosure of which is incorporated herein by reference).

ILLUSTRATIVE EXAMPLES

Example 1

A 100–1000 ml sample of wet process phosphoric acid was treated with the indicated amount of dried calcium fluoride sludge wetted with tap water to give 50% by weight solids.

The sludge was produced in plant equipment using a semi-continuous process. In this procedure pond water and limestone were continuously metered into a pre-reaction tank with 5–15 minutes retention time. The chemical analysis of the pond waste was about 0.98%, $P_2O_5$; 0.42%, F; 0.34%, $SO_4$; 0.018%, $Fe_2O_3$; 0.037%, $Al_2O_3$; 0.16%, CaO; 0.13%, $SiO_2$; and 0.11%, $Na_2O$.

The slurry was pumped to a second reaction tank equipped with an agitator and was then agitated for about 1 to 10 hours. The slurry was then pumped intermittently to a settling tank and allowed to settle for about 5 hours. The underflow sludge containing approximately 50% by weight of fluoride solids was pumped to a storage tank. The product in this storage tank was used to prepare the fluoride solids used in the above example, by drying the wet sludge in the convection oven at 105° C. for six hours, then rewetting the sludge to 50% by weighing of solids.

The acid and the wetted sludge were placed in appropriate sized polypropylene bottles, the tops secured and the contents mixed for about 1–2 minutes by shaking. At the end of this time the screw tops were partially opened and the containers placed in a convection heated oven maintained at 115° F.±2° F. Each day thereafter the top on each container was secured and the contents shaken for several minutes. This procedure was repeated 2 to 3 times per day. At the end of five days of aging a sample of 35 gms of the slurry from each container was ultracentrifuged (30,000+G's) using an International Centrifuge, Universal Model UV, Model 49357M operating at 4000 rpm for 2 minutes. The clear liquor was submitted for chemical analysis by the standard methods used by the Florida Fertilizer Industry. The results are shown in the following Table I.

TABLE I

CHEMICAL ANALYSIS, % BY WEIGHT

| | $P_2O_5$ | MgO | CaO | $Fe_2O_3$ | $Al_2O_3$ | $Na_2O$ | $SiO_2$ | F | $SO_4$ | $CO_2$ |
|---|---|---|---|---|---|---|---|---|---|---|
| Acid [a] Before Treatment | 52.14 | 0.75 | 0.11 | 1.45 | 2.04 | 0.11 | 0.05 | 0.75 | 4.63 | — |
| Dried Fluoride Sludge | 8.91 | 0.17 | 36.31 | 2.57 | 6.37 | 1.36 | 4.37 | 25.00 | 8.71 | 0.51 |
| Acid [a] After Treatment and Five (5) Days Aging at 115° F | | | | | | | | | | |
| (1) Dosage: 2% by weight and/or mole ratio F/Mg in mixture of 3.51 | 52.13 | 0.34 | 0.053 | 1.06 | 1.64 | 0.086 | 0.042 | 0.53 | 4.60 | — |
| (2) Dosage: 3% by weight and/or mole ratio F/Mg in mixture of 4.21 | 51.72 | 0.23 | 0.045 | 1.09 | 1.53 | 0.012 | 0.042 | 0.54 | 4.61 | — |
| (3) Dosage: 4% by weight and/or mole ratio F/Mg in mixture of 4.91 | 52.02 | 0.15 | 0.036 | 1.07 | 1.24 | 0.068 | 0.058 | 0.45 | 4.07 | — |
| Acid With Treatment and Aged for Five (5) Days at 115° F | 52.75 | 0.61 | 0.048 | 1.05 | 1.87 | 0.11 | 0.017 | 0.55 | 4.59 | — |

[a] After ultracentrifuging to remove solids.

EXAMPLE 2

This example compares the effect of different sources of fluoride added to wet process phosphoric acid to remove magnesium. The sources used were:
(I) Potassium fluoride ($KF_o \cdot 2H_2O$)
(II) Calcium fluoride sludge, from pond water treatment (about 50% solids, 10% F)
(III) HF solution (50% aqueous)

Three tests (a, b and d) were run in duplicate. One (c) was a single run. All were at 160° F. for 30 minutes, using a procedure like that in Example 1.

| Test a | Control |
|---|---|
| Test b | I $KF_o \cdot 2H_2O$ = (7.0/100 g acid) |
| Test c | II Calcium fluoride sludge (14.1 g/100 g acid) |
| Test d | III HF Solution (2.98 g/100 g acid) |

Tests b-d were based on 6:1 F:Mg stoichiometry, with estimated 0.5% MgO in the 50% $P_2O_5$ acid.

Three other tests were run in duplicate at 160° F. for 30 minutes.

| Test e | I $KF_o \cdot 2H_2O$ at 160° F for 30 minutes, 4.67/100 g. acid |
| Test f | II CaF sludge 9.38 g/100 g acid, |
| Test g | III 50% aqueous HF - 1.98 g/100 g acid, |

Tests e-g were based on 4:1 F:Mg stoichiometry, with estimated 0.5% MgO in 50% $P_2O_5$ acid.

The results of the first set of runs are below:

| Run | $P_2O_5$ | F | MgO |
|---|---|---|---|
| Acid Control | 51.68 | 1.04 | 0.33 |
| a | 52.28 | 0.57 | 0.14 |
| b | 49.78 | 0.79 | 0.006 |
| c | 50.87 | 0.63 | 0.009 |
| d | 50.74 | 2.03 | 0.24 |
| e | 50.04 | 1.62 | 0.22 |
| f | 51.36 | 0.68 | 0.002 |
| g* | 51.66 | 1.33 | 0.10 |

The results of the second set of runs are below:

| Run | $P_2O_5$ | F | MgO |
|---|---|---|---|
| a-2 | 53.00 | 0.51 | 0.18 |
| b-2 | 50.11 | 0.67 | 0.039 |
| c-2 | — | — | — |
| d-2 | 51.02 | 2.02 | 0.30 |
| e-2 | 50.06 | 1.89 | 0.26 |
| f-2 | 51.88 | 0.57 | 0.038 |
| g-2 | 51.55 | 1.23 | 0.13 |

*Before centrifuging

EXAMPLE 3

A 6 gallon sample of "50% $P_2O_5$" wet process phosphoric acid was put in an oven at 160° F. and let stand for two hours. 4 one gallon jugs were filled with 4200 grams of a supernatant centrifuged sample (centrifuged at 160° F. for 12 minutes at 2000 RPM). The amount of CaF sludge (i.e., "PwS") and the run conditions were as follows:

| Run | Control |
|---|---|
| A | Mechanical agitation only |
| B | 126 gms PwS plus 126 gms $H_2O$ - agitated |
| C | Control shaken twice daily |
| D | 126 gms PwS plus 126 gms $H_2O$ - shake twice daily. |

The analyses of the acids before PWS addition is as follows:

| | $P_2O_5$ | F | $Fe_2O_3$ | $Al_2O_3$ | MgO | $SO_4$ | CaO | MgO × $P_2O_5$ |
|---|---|---|---|---|---|---|---|---|
| Untreated Acid | 49.53 | 2.20 | 1.37 | 2.02 | 0.89 | 4.08 | 1.32 | 1.80 |
| Run A - acid after centrifuge) | 51.99 | 1.20 | 1.24 | 1.43 | 0.61 | 2.71 | 0.15 | 1.17 |

88.69 g of 97.4% $H_2SO_4$ was added to each sample (A, B, C and D) which were agitated well, then prewetted PWS was added to samples B and D.

No immediate reaction was observed when either $H_2SO_4$ or PWS was added to the acid. After 3.5 days, samples A, B, C and D were agitated then centrifuged for 12 min. at 2000 RPM's at 160° F. The analyses of the samples follows:

| Run | $P_2O_5$ | SO | F | Fluoride | MgO | CaO |
|---|---|---|---|---|---|---|
| A | 51.57 | 4.48 | 0.85 | 1.40 | 0.42 | 0.05 |
| B | 51.19 | 2.31 | 0.86 | 1.08 | 0.17 | 0.07 |
| C | 51.54 | 4.64 | 0.80 | 1.86 | 0.39 | 0.04 |
| D | 51.31 | 2.42 | 0.99 | 1.06 | 0.17 | 0.10 |

EXAMPLE 4

In this example the kind and amount of acid and dried fluoride sludge used were the same as that used in Example 1 except that the aging temperature used was 140° ± 3° F. The technique of shaking the samples each day during aging at 140° F. and the method of centrifugation of the samples after five (5) days of aging was the same as described in Example I. The clear liquor portion of each sample after centrifugation was submitted for chemical analysis. The results are shown in the following Table II.

TABLE II

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_3$ | $Al_2O_3$ | $Na_2O$ | $SiO_2$ | F | $SO_4$ | $CO_2$ |
| Parent Acid [a] | 52.14 | 0.75 | 0.11 | 1.45 | 2.04 | 0.11 | 0.05 | 0.75 | 4.63 | — |
| Dried Fluoride Sludge | 8.91 | 0.17 | 36.31 | 2.57 | 6.37 | 1.36 | 4.37 | 25.00 | 8.71 | 0.51 |
| Acid [a] After Treatment and Five (5) Days Aging at 140° F | | | | | | | | | | |
| (1) Dosage: 2% by weight and/or mole ratio F/Mg in mixture of 3.51 | 52.09 | 0.32 | 0.037 | 1.20 | 1.56 | 0.099 | 0.059 | 0.49 | 4.44 | — |
| (2) Dosage: 3% by weight and/or mole ratio F/Mg in mixture of 4.21 | 52.34 | 0.21 | 0.044 | 1.23 | 1.45 | 0.063 | 0.066 | 0.49 | 4.44 | — |
| (3) Dosage: 4% by weight and/or mole ratio F/Mg in mixture of 4.91 | 52.10 | 0.11 | 0.045 | 1.10 | 1.19 | 0.052 | 0.060 | 0.43 | 3.74 | — |
| Acid With No Treatment and Aged for Five (5) Days at 140° F | 51.66 | 0.57 | 0.037 | 1.22 | 1.80 | 0.085 | 0.033 | 0.48 | 4.62 | — |

[a] After ultracentrifuging to remove solids.

EXAMPLE 5

In this example the indicated test was made as follows: A 100-1000 ml sample of the phosphoric acid used in Examples 1 and 2 was treated with the indicated amount of dried calcium fluoride sludge wetted with tap water to give 50% by weight solids. The sludge was prepared in the laboratory on a batch basis by placing a predetermined amount of pond water (3 liters) in a four (4) liter polypropylene beaker equipped with baffles and an agitator. With agitation 47.1 grams of ground limestone were added directly into the pond water. Following (4) hours of reaction time at ambient temperature the slurry was vacuum filtered and the wet solids dried overnight at 105° C. The equipment and method for mixing the acid and the various amounts of prewetted fluoride sludge as described in Example I was used in this Example 3. The samples were aged for (5) days at 115° F. and centifuged in accordance with the method described in Example 1. The clear liquor from each sample was submitted for chemical analyses. The results are shown in the following Table III.

TABLE III

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_3$ | $Al_2O_3$ | $Na_2O$ | $SiO_2$ | F | $SO_4$ | $CO_2$ |
| Parent Acid [a] | 52.14 | 0.75 | 0.11 | 1.45 | 2.04 | 0.11 | 0.05 | 0.75 | 4.63 | — |
| Dried Fluoride Sludge | 17.03 | 0.41 | 49.80 | 1.46 | 4.03 | 1.24 | 1.69 | 25.67 | 3.12 | 0.53 |
| Acid [a] After Treatment and Five (5) Days Aging at 115° F | | | | | | | | | | |
| (1) Dosage: 2% by weight and/or mole ratio F/Mg in mixture of 3.54 | 52.16 | 0.34 | 0.032 | 1.01 | 1.46 | 0.053 | 0.043 | 0.47 | 4.13 | — |
| (2) Doage: 3% by weight and/or mole ratio F/Mg in mixture of 4.21 | 52.95 | 0.24 | 0.036 | 1.07 | 1.41 | 0.10 | 0.044 | 0.47 | 4.05 | — |
| (3) Dosage: 4% by weight and/or mole ratio F/Mg in mixture of 4.91 | 52.20 | 0.19 | 0.032 | 1.06 | 1.36 | 0.10 | 0.046 | 0.60 | 3.69 | — |
| Acid With No Treatment and Aged for Five (5) Days at 115° F | 52.74 | 0.61 | 0.036 | 1.05 | 1.83 | 0.078 | 0.030 | 0.56 | 4.71 | — |

[a] After ultracentrifuging to remove solids.

EXAMPLE 6

In this example the kind and amount of acid and dried calcium fluoride sludge used were the same as those used in Example 5 except that the aging temperature used was 140° F. ± 3° F. The technique of shaking the samples each day during the aging at 140° F. and the method of centrifugation of the samples after (5) days of aging was the same as described in Example 1. The clear liquor from each sample was submitted for chemical analysis. The results are shown in the following Table IV.

TABLE IV

| | CHEMICAL ANALYSIS, % BY WEIGHT | | | | | | | | | |
|---|---|---|---|---|---|---|---|---|---|---|
| | $P_2O_5$ | MgO | CaO | $Fe_2O_3$ | $Al_2O_3$ | $Na_2O$ | $SiO_2$ | F | $SO_4$ | $CO_2$ |
| Parent Acid [a] | 52.14 | 0.75 | 0.11 | 1.45 | 2.04 | 0.11 | 0.05 | 0.75 | 4.63 | — |
| Dried Fluoride Sludge | | | | | | | | | | |
| Acid [a] After Treatment and Five (5) Days Aging at 140° F | | | | | | | | | | |
| (1) Dosage: 2% by weight and/or mole ratio F/Mg in mixture of 3.54 | 52.34 | 0.30 | 0.028 | 1.11 | 1.50 | 0.12 | 0.044 | 0.42 | 4.18 | — |
| (2) Dosage: 3% by weight and/or mole ratio F/Mg in mixture of 4.26 | 52.57 | 0.21 | 0.020 | 1.13 | 1.33 | 0.073 | 0.059 | 0.42 | 3.90 | — |
| (3) Dosage: 4% by weight and/or mole ratio F/Mg in mixture of 4.97 | 52.44 | 0.11 | 0.036 | 1.14 | 1.19 | 0.072 | 0.059 | 0.43 | 3.68 | — |
| Acid With No Treatment and Aged for Five (5) Days at 140° F | 52.91 | 0.58 | 0.029 | 1.17 | 1.79 | 0.062 | 0.029 | 0.48 | 4.57 | — |

[a] After ultracentrifuging to remove solids.

EXAMPLE 7

A sample of dried CaF sludge from a plant scale test in which limestone was used to treat pond water gave the following analysis.

| $P_2O_5$ | MgO | CaO | $Fe_2O_3$ | $Al_2O_3$ | $Na_2O$ | $SiO_2$ | F | $SO_4$ | $CO_2$ |
|---|---|---|---|---|---|---|---|---|---|
| 8.91 | 0.17 | 36.3 | 2.57 | 6.37 | 1.36 | 4.37 | 25.00 | 8.71 | 0.51 |

Fresh CaF sludge was made in the laboratory using pond water (0.46% F, 0.79% $P_2O_5$) and limestone (1.33 stoichiometric to the fluorine content of the pond water). The chemical analysis of the dried sludge is shown below.

| $P_2O_5$ | MgO | CaO | $Fe_2O_5$ | $Al_2O_3$ | $Na_2O$ | $SiO_2$ | F | $SO_4$ | $CO_2$ |
|---|---|---|---|---|---|---|---|---|---|
| 17.03 | 0.41 | 49.8 | 1.46 | 4.03 | 1.24 | 1.69 | 25.67 | 3.12 | 0.53 |

Both of the above CaF sludges were used to treat fresh evaporator product phosphoric acid. The chemical analysis of the acid as received and after ultracentrifuging (U.C.) to remove the solids is shown in the following table:

These results show the effect of F/MgO ratio when treating phosphoric acid with CaF sludge having different weight ratios of Ca/F.

The present process can be used on any wet process phosphoric acid (whether produced with nitric, sulfuric or hydrochloric acid) and can also be useful in removing impurities from such spent industrial phosphoric acid as is produced in the anodizing of aluminum.

TABLE 5

| Material | $P_2O_5$ | MgO | CaO | $Fe_2O_3$ | $Al_2O_3$ | $Na_2O$ | $SiO_2$ | F | $SO_4$ | Solids | $CO_2$ | Crys. $H_2O$ at 250° C |
|---|---|---|---|---|---|---|---|---|---|---|---|---|
| Parent Acid | | | | | | | | | | | | |
| As Is[1] | 50.18 | 0.75 | 0.72 | 1.38 | 2.01 | 0.62 | 0.62 | 1.91 | 5.61 | 3.89 | — | — |
| U.C. | 52.14 | 0.75 | 0.11 | 1.45 | 2.04 | 0.11 | 0.05 | 0.75 | 4.63 | — | — | — |
| Bad Synspar[2] (DB) | 8.91 | 0.17 | 36.31 | 2.57 | 6.37 | 1.36 | 4.37 | 25.00 | 8.71 | 54.50 | 0.51 | — |
| Good Synspar[3] (DB) | 17.03 | 0.41 | 49.40 | 1.46 | 4.03 | 1.24 | 1.69 | 25.67 | 3.12 | — | 0.53 | 5.81 |
| | | | | | | | | | | % Removal | | MgO at |
| Treated Acid at 5 Aging Days: | | | | | | | | | | MgO | $Al_2O_3$ | 70% SPA |
| Test* | | | | | | | | | | | | |
| 1a | 52.75 | 0.61 | 0.048 | 1.05 | 1.87 | 0.11 | 0.017 | 0.55 | 4.59 | 19.44 | 9.21 | 0.81 |
| b | 52.13 | 0.34 | 0.053 | 1.06 | 1.64 | 0.086 | 0.042 | 0.53 | 4.60 | 54.86 | 19.44 | 0.46 |
| c | 51.72 | 0.23 | 0.045 | 1.09 | 1.53 | 0.12 | 0.042 | 0.54 | 4.61 | 69.44 | 24.30 | 0.31 |
| d | 52.02 | 0.15 | 0.036 | 1.07 | 1.24 | 0.068 | 0.058 | 0.45 | 4.07 | 79.86 | 39.13 | 0.20 |
| 2a | 51.66 | 0.57 | 0.037 | 1.22 | 1.80 | 0.085 | 0.033 | 0.48 | 4.62 | 23.61 | 11.00 | 0.77 |
| b | 52.09 | 0.32 | 0.037 | 1.20 | 1.56 | 0.099 | 0.059 | 0.49 | 4.44 | 57.64 | 23.53 | 0.43 |
| c | 52.34 | 0.21 | 0.044 | 1.23 | 1.45 | 0.063 | 0.066 | 0.49 | 4.44 | 72.22 | 29.16 | 0.28 |
| d | 52.10 | 0.11 | 0.045 | 1.10 | 1.19 | 0.052 | 0.060 | 0.43 | 3.74 | 85.42 | 41.69 | 0.15 |
| 3a | 52.74 | 0.61 | 0.036 | 1.05 | 1.83 | 0.078 | 0.030 | 0.56 | 4.71 | 19.44 | 11.25 | 0.81 |
| b | 52.16 | 0.34 | 0.032 | 1.01 | 1.46 | 0.053 | 0.043 | 0.47 | 4.13 | 54.86 | 28.39 | 0.46 |
| c | 52.95 | 0.24 | 0.036 | 1.07 | 1.41 | 0.10 | 0.044 | 0.47 | 4.05 | 68.75 | 31.97 | 0.32 |
| d | 52.20 | 0.19 | 0.032 | 1.06 | 1.36 | 0.10 | 0.046 | 0.60 | 3.69 | 75.00 | 33.25 | 0.25 |
| 4a | 52.91 | 0.58 | 0.029 | 1.17 | 1.79 | 0.062 | 0.029 | 0.48 | 4.57 | 23.61 | 13.55 | 0.77 |
| b | 52.34 | 0.30 | 0.028 | 1.11 | 1.50 | 0.12 | 0.044 | 0.42 | 4.18 | 60.42 | 26.60 | 0.40 |
| c | 52.57 | 0.21 | 0.020 | 1.13 | 1.33 | 0.073 | 0.059 | 0.42 | 3.90 | 72.22 | 35.29 | 0.28 |
| d | 52.44 | 0.11 | 0.036 | 1.14 | 1.19 | 0.072 | 0.059 | 0.43 | 3.68 | 85.42 | 41.94 | 0.15 |

| Test* | Type Synspar | Storage Temp. °F | % SNS Treatment |
|---|---|---|---|
| T1 | "Bad" | 115 | a 0 Control |
| 2 | "Bad" | 140 | b 2 |
| 3 | "Good" | 115 | c 3 |
| 4 | "Good" | 140 | d 4 |

Source
[1] Dorr-Oliver Evap. Prod.
[2] S.G.S. Tank
[3] R&D Batch Produced

| Sample | $P_2O_5$ | MgO | CaO | $Fe_2O_5$ | $Al_2O_3$ | $Na_2O$ | $SiO_2$ | P | $SO_4$ | Solids |
|---|---|---|---|---|---|---|---|---|---|---|
| As Received | 50.18 | 0.75 | 0.72 | 1.38 | 2.01 | 0.62 | 0.62 | 1.91 | 5.61 | 3.89 |
| After U.C. | 52.14 | 0.75 | 0.11 | 1.45 | 2.04 | 0.11 | 0.05 | 0.75 | 4.63 | — |

Summaries of the aging tests are shown in Table 5. In general the results indicate that for equal sludge treatment (mole ratio of F/MgO), and at the same aging temperature there was virtually no difference in the precipitation rates of MgO for the plant sludge and laboratory sludge. However, this series of tests demonstrates the significance of treatment temperature. The two (2) percent treatment using both sludges adjusted the mole ratio of F/Mg in each case to about 3.5 prior to aging. In the laboratory, it has been found that a mole ratio of F/Mg in the sludge treated feed of 3.8–5.0 will consistently reduce the weight ratio of $MgO/P_2O_5 \times 10^2$ in the filtered product to 0.85 or less in 2–3 days of aging at 115°–140° F. (see Table III for ratio 4.91).

EXAMPLE 8

In removal of metallic ions by CaF containing solids (e.g., synthetic fluorospar), the sulfate ion concentration of the phosphoric acid can have a significant influence. This example illustrates (see Tables 6, 7 and 8) the % removal of magnesium ions (as MgO) and aluminum ions (as $Al_2O_3$) by addition of sulfuric acid (stoichiometric to the fluoride in the Synspar) and synthetic fluorospar ("SNS" or "Synspar" in the Tables) as a 53% aqueous sludge (the "Synspar" analysis in Table 6 is on a dry basis) on three samples of 40 to 45% $P_2O_5$ phosphoric acid produced by the "OXY Hemihydrate Process" described in U.S. application Ser. No. 703,208 of Ore et al filed July 7, 1976 (the entire Disclosure of which is incorporated herein). The Tables show the results of adding 2, 3 and 4% SNS (on a dry basis) and aging for 4 days at the indicated temperature (160°, 140° or 120°

F.), then filtering to remove precipitated solids. A negative % removal indicates that the acid treated actually picked up metallic ion impurities from the added SNS.

In Table 8, runs 4A and 4B, respectively, show that no difference was observed when the order of addition of the additional sulfuric acid and the Synspar was reversed.

TABLE 6

Test 1 Hemi/SNS

| Parent Materials | $P_2O_5$ | $Fe_2O_3$ | $Al_2O_3$ | MgO | $SO_4$ | F | $SiO_2$ | $Na_2O$ | Solids | % $H_2SO_4$ | CaO | $CO_2$ |
|---|---|---|---|---|---|---|---|---|---|---|---|---|
| Hemi Acid (As Is) | 40.34 | 1.12 | 1.02 | 0.49 | 3.50 | 1.05 | 0.33 | 0.13 | 0.51 | — | — | — |
| Hemi Acid (UC) | 40.34 | 1.12 | 1.02 | 0.50 | 3.37 | 0.95 | 0.29 | 0.10 | — | — | — | — |
| Synspar (DB) | 17.47 | 1.67 | 3.17 | 0.43 | 4.56 | 23.08 | 4.51 | — | (47.45) | — | 47.20 | 0.64 |
| Plant $H_2SO_4$ | — | — | — | — | — | — | — | — | — | 91.32 | — | — |

| Treated Acid at 4 Days Aging | | | | | | | | | Solids Before UC | % Removal | | MgO at 70% SPA |
|---|---|---|---|---|---|---|---|---|---|---|---|---|
| | | | | | | | | | | MgO | $Al_2O_3$ | |
| at 140° F at 0% SNS (UC) | 41.48 | 1.07 | 1.06 | 0.51 | 3.54 | 0.97 | 0.29 | 0.092 | 1.71 | 0.81 | −1.19 | 0.86 |
| 2 (UC) | 40.38 | 1.06 | 0.97 | 0.43 | 3.01 | 1.18 | 0.32 | 0.061 | 4.73 | 14.52 | 5.14 | 0.74 |
| 3 (UC) | 40.48 | — | 0.85 | 0.33 | — | — | — | — | — | 33.87 | 17.00 | 0.57 |
| 4 (UC) | 39.99 | 1.07 | 0.77 | 0.26 | 2.53 | 1.24 | 0.35 | 0.083 | 7.14 | 47.58 | 23.72 | 0.46 |
| at 120° F at 0 (UC) | 40.71 | 1.05 | 1.04 | 0.52 | 3.39 | 1.01 | 0.28 | 0.069 | 1.41 | −3.23 | −0.79 | 0.90 |
| 2 (UC) | 39.86 | 1.06 | 1.04 | 0.48 | 3.17 | 1.31 | 0.31 | 0.067 | 2.21 | 3.23 | −3.16 | 0.84 |
| 3 (UC) | 39.66 | — | 0.97 | 0.43 | — | — | — | — | — | 12.90 | 3.16 | 0.76 |
| 4 (UC) | 39.59 | 1.08 | 0.88 | 0.36 | 3.01 | 1.32 | 0.35 | 0.069 | 4.27 | 26.61 | 12.25 | 0.64 |

UC = after ultracentrifuging for 5 minutes at 16,000 RPM.
DB = dry basis

TABLE 7

Test 2 Hemi/SNS

| Material | $P_2O_5$ | $Fe_2O_3$ | $Al_2O_3$ | MgO | *$SO_4$ | F | $SiO_2$ | $Na_2O$ | Solids |
|---|---|---|---|---|---|---|---|---|---|
| Parent Acid (As Is) | 44.28 | 1.21 | 1.02 | 0.56 | 1.13 | 1.24 | 0.42 | 0.16 | 1.42 |
| Parent Acid (U.C.) | 44.73 | 1.21 | 1.03 | 0.56 | 0.45 | 1.02 | 0.34 | 0.08 | — |

| Treated Acid at 4 Days Aging | | | | | | | | | Solids Before UC | % Removal | | MgO at 70% SPA |
|---|---|---|---|---|---|---|---|---|---|---|---|---|
| | | | | | | | | | | MgO | $Al_2O_3$ | |
| at 140° F at 0% SNS (UC) | 45.54 | 1.16 | 1.07 | 0.59 | 0.65 | 1.08 | 0.35 | 0.09 | 1.51 | −4.00 | −2.17 | 0.91 |
| at 140° F 2 (UC) | 44.44 | 1.15 | 1.10 | 0.57 | 0.67 | 1.37 | 0.40 | 0.10 | 4.79 | −2.40 | −7.83 | 0.90 |
| at 140° F 3 (UC) | 44.06 | — | 1.05 | 0.57 | — | — | — | — | — | −3.20 | −3.48 | 0.90 |
| at 140° F 4 (UC) | 43.74 | 1.17 | 1.00 | 0.56 | 1.43 | 1.37 | 0.40 | 0.07 | 7.49 | −2.40 | 0.43 | 0.90 |
| at 120° F at 0 (UC) | 45.21 | 1.17 | 1.09 | 0.59 | 0.58 | 1.14 | 0.38 | 0.13 | 0.17 | −4.80 | −4.78 | 0.92 |
| at 120° F 2 (UC) | 44.21 | 1.16 | 1.04 | 0.59 | 0.40 | 1.33 | 0.41 | 0.07 | 2.35 | −6.40 | −2.17 | 0.93 |
| at 120° F 3 (UC) | 43.54 | — | 1.04 | 0.57 | — | — | — | — | — | −4.80 | −3.91 | 0.92 |
| at 120° F 4 (UC) | 43.43 | 1.16 | 1.06 | 0.58 | 0.61 | 1.44 | 0.41 | 0.08 | 5.19 | −7.20 | −6.09 | 0.94 |
| Treated Acid at 4 Days at 140° F Plus 2 Days at 160° F | | | | | | | | | | | | |
| 0 (UC) | 47.50 | | 1.11 | 0.60 | | | | | | −0.80 | −1.74 | 0.88 |
| 2 (UC) | 45.75 | | 1.04 | 0.57 | | | | | | 0 | 1.30 | 0.88 |
| 4 (UC) | 45.93 | | 1.02 | 0.53 | | | | | | 8.00 | 3.48 | 0.81 |
| Repeat Test - Treated Acid at 4 Days Aging | | | | | | | | | | | | |
| at 140° F at 0% Control | 45.54 | | 1.09 | 0.59 | 0.57 | | | | | −4.00 | −3.91 | 0.91 |
| 4 SNS/$H_2SO_4$ | 43.77 | | 1.04 | 0.56 | 0.65 | | | | | −2.40 | −3.48 | 0.90 |
| $H_2SO_4$/SNS | 43.77 | | 1.07 | 0.57 | 0.68 | | | | | −4.00 | −6.09 | 0.91 |
| [2.5] SNS/$H_2SO_4$ | 44.02 | | 0.87 | 0.38 | 1.50 | | | | | 31.20 | 13.91 | 0.60 |
| [2.5] $H_2SO_4$/SNS | 43.80 | | 0.91 | 0.41 | 1.53 | | | | | 24.80 | 9.57 | 0.66 |
| [3.8] SNS/$H_2SO_4$ | 43.23 | | 0.82 | 0.33 | 2.46 | | | | | 39.20 | 17.39 | 0.53 |
| [3.8] $H_2SO_4$/SNS | 43.41 | | 0.80 | 0.33 | 2.65 | | | | | 39.20 | 20.00 | 0.53 |

*The decrease in $SO_4$ after ultracentrifuging is probably due to removal of calcium sulfate in the acid.

TABLE 8

Test 3 Hemi

| | $P_2O_5$ | $Fe_2O_3$ | $Al_2O_3$ | MgO | $SO_4$ | F | $SiO_2$ | $Na_2O$ | Solids |
|---|---|---|---|---|---|---|---|---|---|
| Hemi Acid (As Is) | 41.84 | 0.96 | 1.05 | 0.48 | 2.37 | 1.19 | 0.44 | 0.14 | 0.58 |
| Hemi Acid (UC) | 42.24 | 0.98 | 1.07 | 0.48 | 2.27 | 1.10 | 0.39 | 0.093 | — |

| Treated Acid After 4 Aging Days at 140° F % SNS | | | | | | | | | Solids Before UC | Removal | | MgO in 70% SPA |
|---|---|---|---|---|---|---|---|---|---|---|---|---|
| | | | | | | | | | | $Al_2O_3$ | MgO | |
| 0 (UC) | 42.99 | 1.04 | 1.03 | 0.49 | 2.18 | 1.00 | 0.34 | 0.09 | 0.36 | 5.14 | 0 | 0.80 |
| 2 (UC) | 42.41 | 1.04 | 1.10 | 0.47 | 1.90 | 1.42 | 0.37 | 0.06 | 2.47 | −2.37 | 2.63 | 0.78 |
| 3 (UC) | 41.90 | — | 1.06 | 0.43 | — | — | — | — | — | 0 | 9.65 | 0.72 |
| 4A SNS/$H_2SO_4$ | 41.58 | 1.04 | 0.99 | 0.38 | 1.86 | 1.50 | 0.41 | 0.06 | 4.77 | 5.93 | 20.18 | 0.64 |
| 4B $H_2SO_4$/SNS | 41.90 | 1.05 | 0.95 | 0.35 | 1.81 | 1.44 | 0.42 | 0.06 | 5.04 | 10.28 | 26.32 | 0.59 |

I claim:

1. A process for the removal of at least one metallic ion impurity from phosphoric acid comprising the steps of:

(a) adding to the acid a sludge precipitant comprising at least 50% by weight calcium fluoride on a dry basis;
(b) allowing the formation of a precipitate containing the impurity; and
(c) separating the precipitate from the acid.

2. The process of claim 1 wherein said metallic ion impurity comprises divalent magnesium.

3. The process of claim 1 wherein said metallic ion impurity comprises trivalent aluminum.

4. The process of claim 1 wherein said precipitant comprises a precipitated sludge obtained by treatment of wet process phosphoric acid plant pond water with a calcium compound to remove fluoride therefrom.

5. The process of claim 1 wherein, at least after addition of said precipitant, said impure phosphoric acid is maintained at a temperature in the range of about 115° to 140° F. for sufficient time to permit said precipitation to occur.

6. The process of claim 5 wherein said period of time is in the range of about 2 to 3 days.

7. The process of claim 1 wherein sulphuric acid is added to said phosphoric acid in an amount effective to increase the rate of precipitation of said impurities.

8. The process of claim 1 wherein said phosphoric acid is a wet process acid analyzing in the range of 38 to 54% $P_2O_5$.

9. The process of claim 8 wherein said acid is produced by a hemihydrate process.

10. The process of claim 1 wherein the molar ratio of calcium to fluorine in the precipitant is about 1:2.

11. Process for removal of magnesium ions from impure wet process phosphoric acid, said process comprising
adding to the acid a precipitant comprising the sludge comprising calcium and fluoride ions obtained by addition of calcium ions to a fluoride containing pond water, said sludge also containing compounds of phosphorous, magnesium, iron, aluminum, sodium, silica and sulfur and, having a weight ratio MgO to F in the range of about 1 to 23 to about 1 to 260 and a molar ratio of calcium to fluorine of about 1:2;
maintaining said acid, after adding said precipitant, at a temperature in the range of about 115° to 160° F. for sufficient time to permit a precipitate to form; and,
separating said precipitate from the purified acid.

12. The process of claim 11 wherein sulfuric acid is added to said phosphoric acid in an amount effective to increase the rate of formation of said precipitate.

13. The process of claim 12 wherein sulfuric acid is added to said phosphoric acid in an amount stoichiometric to the fluorine added to the phosphoric acid.

14. A process for removing magnesium ions and aluminum ions from phosphoric acid comprising the steps of:
(a) treating phosphoric acid containing aluminum and magnesium ions by adding to the phosphoric acid a wetted precipitant comprising calcium and fluorine in a molar ratio of fluorine to calcium of about 2:1 in an amount sufficient to yield a molar ratio of fluorine ions to magnesium ions in the treated phosphoric acid mixture of from 3.8 to 5;
(b) maintaining the treated phosphoric acid at an elevated temperature for a sufficient time to form a precipitate containing magnesium and aluminum; and
(c) separating formed precipitate from the treated phosphoric acid.

15. The process of claim 14 wherein the precipitant comprises a precipitated sludge obtained by treatment of wet process phosphoric acid plant pond water containing fluoride with a calcium compound.

16. The process of claim 14 wherein the treated phosphoric acid is maintained at an elevated temperature in the range of about 115° to 140° F.

17. The process of claim 16 wherein the treated phosphoric acid is maintained at an elevated temperature for a period of time in the range of about 2 to 6 days.

18. The process of claim 14 wherein the treated phosphoric acid is maintained at an elevated temperature for a period of time in the range of about 2 to 6 days.

19. The process of claim 14 wherein sulfuric acid is added to the phosphoric acid in an amount stoichoimetric to the fluorine added to the phosphoric acid.

20. The method of claim 14 in which the separated formed precipitate of step (c) comprises Ralstonite.

21. A process for removing impurities from wet process phosphoric acid comprising 38 to 54% by weight $P_2O_5$, 0.3 to 1.75% by weight MgO, as well as sodium, iron, and aluminum, comprising the steps of:
(a) precipitating sludge from a fluoride containing wet process phosphoric acid plant pond water by adding a calcium compound to the pond water, the sludge comprising calcium and fluoride ions in a molar ratio of calcium to fluoride ions of about 1:2, and also containing compounds of phosphorus, magnesium, iron, aluminum, sodium, silica and sulfur, and having a weight ratio of MgO to F in the range of about 1:23 to about 1:260;
(b) treating the phosphoric acid by combining the phosphoric acid with a sufficient quantity of such sludge for forming a precipitate;
(c) maintaining the treated phosphoric acid at a temperature in the range of about 115° to 140° F. for a period of time in the range of about 2 to 6 days for forming a precipitate comprising sodium, aluminum, and magnesium; and
(d) removing formed precipitate from the phosphoric acid.

* * * * *